United States Patent

[11] 3,607,796

| [72] | Inventors | Hans Eberle<br>Limburgerhof, Pfalz;<br>Gerhard Wuttke, Neuhofen, Pfalz, both of<br>Germany |
|---|---|---|
| [21] | Appl. No. | 793,914 |
| [22] | Filed | Jan. 24, 1969 |
| [45] | Patented | Sept. 21, 1971 |
| [73] | Assignee | Grunzweig & Hartmann Aktiengesellschaft<br>Ludwigshafen am Rhine, Germany |
| [32] | Priority | Jan. 27, 1968 |
| [33] | | Germany |
| [31] | | P 16 94 357.0 |

[54] FOAM-FORMING POLYPROPYLENE COMPOSITION
23 Claims, No Drawings

[52] U.S. Cl. .................................................. 260/2.5 E,
260/2.5 R, 260/33.6 PQ, 260/93.7, 260/94.9 GD,
260/897 A, 260/897 R, 260/897 C
[51] Int. Cl. .................................................... C08f 3/08,
C08f 29/12, C08f 47/10
[50] Field of Search ........................................... 260/2.5 E,
897

[56] References Cited
UNITED STATES PATENTS

| 3,250,730 | 5/1966 | Palmer ........................ | 260/2.5 (E) |
|---|---|---|---|
| 3,250,731 | 5/1966 | Buhl ............................ | 260/2.5 (E) |
| 3,251,728 | 5/1966 | Humbert et al. ............. | 260/2.5 (E) |

*Primary Examiner*—Murray Tillman
*Assistant Examiner*—Wilbert J. Briggs, Sr.
*Attorney*—Michael S. Striker

ABSTRACT: A foam-forming polypropylene composition comprising
  a. a major proportion of a stereoregular propylene polymer having a relatively high molecular weight, the said molecular weight being too high to permit foaming of the polymer by means of a low-boiling hydrocarbon blowing agent;
  b. a minor proportion of a relatively low molecular weight heptane-soluble propylene polymer; and
  c. a blowing agent having sufficient affinity for the low molecular weight polypropylene to be absorbed thereby, the said blowing agent being substantially homogeneously distributed throughout the entire polymer mass due to the solubility of the low molecular weight polypropylene in the high molecular weight polypropylene.

FOAM-FORMING POLYPROPYLENE COMPOSITION

BACKGROUND OF THE INVENTION

This invention relates to a foam-forming polypropylene composition. More particularly, it relates to a plastic mass which is adapted to form a foam and shaped bodies made thereof, the plastic mass being a high molecular polyolefin base composition.

Various methods have been used in the past to cause foaming of different plastic masses. These methods either comprised physical means or chemical means or combined both of these means. Physical methods are particularly used in connection with the foaming of polystyrene masses. In this case low-boiling organic liquids are used, particularly hydrocarbons such as pentane, etc., which are homogeneously incorporated in the polystyrene mass. These organic liquids are nonsolvents or only weak swelling agents for the polymer but still have a sufficient affinity to the particular polymer to be absorbed thereby. During the foaming process and the increased temperature employed in connection therewith, the plastic mass is blown up to a foam of a fine cell structure.

This type of foaming process is rather economical and the products have rather good properties. However, the process is limited to certain specific materials such as polystyrene and is not useful for other materials such as polypropylene, which are distinguished by low density and particularly by very good mechanical, chemical, thermic and electric properties.

Polyolefins and other vinyl polymerizates such as polyvinyl chloride are usually caused to foam by combined chemical and physical methods. This is accomplished by incorporating in the mass homogeneously certain compounds which, at elevated temperatures, are decomposed upon splitting off of gaseous products such as carbon dioxide and/or nitrogen or other gaseous decomposition products. The gaseous products thus generated operate as blowing agents and the foam obtained thereby is therefore always contaminated with a more or less significant amount of decomposition products. This is a rather expensive proceeding, and thus undesirable. The residual decomposition products, besides, may cause a discoloration of the foam material, may lower the otherwise desirable electrical properties of the polymerizate and may impart an odor to the final product.

In view of the excellent mechanical and electrical properties of the polyolefins, there is a genuine demand for a foamable mass which could be foamed in analogy to the styrene polymers by purely physical methods. Particularly a foam on the basis of polypropylene and the thus-made shaped products are of value since polypropylene, because of its lower density and its already pointed out very good chemical, mechanical, thermic and electric properties as compared with polyethylene, is a desirable raw material for a foam.

Various attempts have therefore been made to cause foaming of polypropylene, particularly by incorporating therein substances which yield the gaseous decomposition products at elevated temperature. However, these processes are comparatively expensive and have the shortcomings pointed out above. Usually, there remain substantial amounts of contaminations in the foam. Propylene foam of this type has found only a limited industrial use, such as a cable insulation.

Polypropylene presents the further difficulty that in case of a polymerization by means of radical formation or cationic catalysts, usually no truly high molecular products are obtained, such as in the case with the polymerization of ethylene by a similar process. For instance if propylene is polymerized with chromium oxide catalysts (German Pat. No. 1,050,004) or with molybdenum oxide catalysts (German Pat. No. 1,001,003), only mixtures of crystalline and amorphous products are obtained which have a molecular weight so low that these processes have not found industrial acceptance. Besides, in these processes polymers are frequently formed as by-products in the form of viscous liquids or rubbery masses.

High molecular polypropylenes having a high portion of crystalline components resulting in the excellent mechanical and thermic properties of the products have first been formed on the basis of the research by NATTA on an industrial scale; see Makromoleculare Chemie 16, 77, 1955. This polymerization as developed by NATTA and employing mixed catalysts of the type invented by ZIEGLER leads to a polymerization process with an anionic mechanism in which olefins such as propylene or similar products are converted to high molecular linear head-to-tail polymers which are usually designated under the generic term of tactic or stereoregular polymerizates. Of particular industrial interest are the crystalline isotactic polymerizates. The properties of the stereoisomeric polymerizates can be adapted to the desired use by a corresponding selection of the stereospecific NATTA catalysts.

With the advent of the high molecular stereoregular polypropylenes of NATTA and the large-scale industrial manufacture thereof, it became urgent to find a suitable method for obtaining foamable mixtures of these polymers. It was generally considered a regrettable disadvantage of these polymers, which have a high crystalline order, that they are more or less indifferent to low-boiling-point hydrocarbons which were known and had been preferred as blowing agents. The use of blowing agents which form gaseous decomposition products at elevated temperatures has not been industrially accepted for economic reasons in case of the polypropylenes.

It is therefore an object of the present invention to provide for a foamable mass of NATTA-type polypropylenes. It is a more specific object to provide for a foamable mass of this type and a process for making foams from these polymers wherein the final products are free of contaminations by gaseous decomposition products formed by blowing agents.

SUMMARY OF THE INVENTION

These objects are met by a foam-forming polypropylene composition comprising
  a. a major proportion of a stereoregular propylene polymer having a relatively high molecular weight, the said molecular weight being too high to permit foaming of the polymer by means of a low-boiling hydrocarbon blowing agent;
  b. a minor proportion of a relatively low molecular weight heptane-soluble propylene polymer; and
  c. a blowing agent having sufficient affinity for the low molecular weight polypropylene to be absorbed thereby, the said blowing agent being substantially homogeneously distributed throughout the entire polymer mass due to the solubility of the low molecular weight polypropylene in the high molecular weight polypropylene.

The polypropylene may be a copolymer or a graft polymer and other olefins may be used in the polymerizate.

DESCRIPTION OF THE PREFERRED EMBODIMENTS

The stereoregular high molecular weight polypropylene used in the present invention preferably has a molecular weight above 600,000 and preferably in the range between about 700,000 and 1,200,000. The reduced viscosity of the polypropylene measured in DEKALIN at 135° C. ($c=0.1\%ig$, stabilized with 0.2%N-phenyl-beta-naphthylamine) is between $\eta_{red}=5$ and $\eta_{red}=10$.

The DEKALIN used in this measurement is a decahydronaphthalene made by the Dehydag Company of Germany.

These figures apply to the propylene homopolymerizate. The predominantly crystalline tactic NATTA polypropylenes are particularly useful for the purposes of the invention. However, there could also be used copolymerizates of propylene with other olefins including compatible vinyl derivatives. There could also be used graft polymerizates on the basis of the indicated polypropylenes or mixtures of the polypropylenes with monomers of the compounds mentioned. These mixtures should be understood to be included in the term "propylene polymers" or "propylene polymerizates" as used in this specification.

However, it is essential for the invention that the high molecular foamable plastic mass contains also a certain amount of low molecular polymers since the latter are the solution promoters for the blowing agent. Preferably the low molecular polymers are likewise propylene polymers of the general indicated type.

The compositions of the foamable plastic masses of the invention can be varied in several respects. The necessary heptane-soluble low molecular fraction can be incorporated in the predominantly high molecular tactic polypropylene mass in various ways. The preferred embodiment comprises a propylene polymerizate in which the low molecular fraction has been incorporated during formation, that is, in statu nascendi. This will result in a particularly good homogeneous distribution of the low molecular fraction in the high molecular crystalline fraction.

Mixtures of this type can, for instance, be obtained the gas phase polymerization of propylene with suitable ZIEGLER-NATTA catalysts. Surprisingly good results are also obtained if a gas phase polymerizate composed in accordance with the invention is employed which has not been subjected to specific purification processes and therefore still contains residual catalyst. Shaped bodies made by foaming a plastic mass of this type surprisingly do not exhibit any tendency to adopt a yellow tinge and retain their brilliantly white color even when exposed to intense light.

It is thus preferred to use polymerizates for the invention which have already the required composition from the time of their manufacture. The invention, however, also comprises mechanical mixtures of tactic, particularly isotactic, high molecular homopolymers, copolymers and graft polymers of propylene with other suitable plastics, particularly polyethylene and other polyolefins and vinyl polymerizates, etc.

The preferred embodiment of a foamable mass of the invention is a propylene polymerizate which has been formed by gas phase polymerization and comprises 5 to 35 w/o, preferably about 20 w/o, of polymers having average molecular weight below 230,000; 30–50 w/o, preferably about 40 w/o, polymers having an average molecular weight between 230,000 and 1,150,000; and 30–50 w/o, preferably about 40 w/o, polymers with an average molecular weight above 1,150,000. In the last-mentioned fraction there can be included up to about 5 w/o polymers with a molecular weight above 3,000,000.

A fraction of between 5 and 35 w/o, preferably about 10 w/o, of the initial material has a low molecular weight and is heptane-soluble and comprises isotactic and atactic polymers with an average molecular weight between about 10,000 and 100,000.

The isotactic index of the formable plastic mass is between 65 and 95%, preferably 90%. The reduced specific viscosity measured in DEKALIN at 135° C. as a 0.1% stabilized solution is between 8 and 10, preferably is about 9.8.

The preferred polypropylene has the following structure parameters in the prior to foaming:
a. Numerical mean of the molecular weight:
$\overline{M}_n$ figured as 125,000
b. Weight mean of molecular weight:
$\overline{M}_w$ figured as 1,151,000
c. Molecular weight distribution:
$(\overline{M}_w/\overline{M}_n - 1) = 8.2$ The crude density is below 0.90. The melting range determined by means of a polarization microscope is in the range between about 158° and 162° C.

It is also possible to use mechanical mixtures of the high molecular stereoregular fraction with the low molecular heptane-soluble polymerizate. If this is desired, the low molecular fraction can be made separately, for instance by means of a chromium oxide or molybdenum oxide catalyst by the Phillips or Standard Oil process (for instance, in accordance with German Pat. No. 1,050,004 or 1,001,003). However, as already mentioned, it is preferred to use a gas phase polymerized polypropylene wherein the required fraction of low molecular components has already been incorporated during the manufacture.

The amount and the molecular weight of the low molecular fraction can be varied within the stated limits. It may be determined with a view to the required fine cell structure of the foam, the mechanical, thermic, or electrical properties of the foam material, and it can be found by suitable preliminary tests. The experience is that the cell size of the foam will be so much smaller as the foaming agent is harder to dissolve in the plastic mass. Thus, with high molecular polypropylene which, by itself, has no affinity for the solvent, the addition of the solution promoter accomplishes the incorporation of the blowing agent in the high molecular fraction by means of the low molecular portion.

In general it can be stated that the plastic mass of the invention is suitable to form a foam if the low molecular homo-, co- or graft polymerizates are not only endowed with affinity to the solvent but, because of their unlimited miscibility with the high molecular fraction that is inert towards the solvent, can act, so to speak, as transfer means for the blowing agent for the entire plastic mass.

It is therefore of the essence to the invention that the polymers selected have a certain affinity for the blowing agent which must be large enough so that the blowing agent is absorbed or taken up by the low molecular components. The homogeneous distribution is then accomplished by the solubility of the low molecular fraction in the high molecular polymer prior to foaming in the extruder.

The blowing agent used in the invention may be a conventional hydrocarbon such as pentane or similar and may also be substituted. Preferably, the blowing agent is a gasoline fraction with a boiling range between about 60 and 95° C. The blowing agent can be impressed on the melted propylene polymerizate in the extruder. It is also possible to feed into the extruder a mixture of propylene polymerizate in powdery form and a blowing agent that is liquid at room temperature and normal pressure. The introduction may be effected through the usual inlet funnel.

Particularly preferred are hydrocarbons having five to ten carbon atoms in the chain. Foams of a particularly fine cell structure are obtained if a stereoregular polypropylene is used which has been formed by gas phase polymerization; see "Europa-Chemie" Nr. 19, 1967, S.11.

Suitable foamed shaped bodies can be made by foaming of the mass composed in accordance with the invention in a conventional foaming process. Particularly suitable is the foaming by means of an extruder, by injection or extrusion blowing.

The foamable plastic mass of the invention opens up a new application for polypropylenes because it permits the foaming of the otherwise highly desirable polypropylene by physical methods. Contrary to what was considered the rule by the skilled workers in this field, even very high molecular weight propylenes can be foamed and processed without any substantial degradation. Plastic foams, plastic shaped bodies, have physical properties which are about in between the conventional polyethylenes and polypropylenes that have been foamed by means of gas-generating blowing agents. Particularly valuable is their high impact resistance even at low temperatures.

The plastic masses of the invention and the shaped bodies made thereby do not exhibit any mentionable water absorption. Their mechanical properties therefore are not impaired by storing in water or by weather conditioned humidity. The well known excellent chemical resistance and the absence of stress corrosion cracking characteristic for polypropylene remains fully preserved after foaming.

The properties of the foamable mass and the shaped bodies formed thereby can be further modified if desired by adding to the mass, prior to foaming, a conventional cross-linking agent and incorporating it therein homogeneously. The cross-linking agent preferably is used in amounts between 0.1 and 5 w/o relative to the total weight of the plastic mass. Cross-linking agents which can be used are for instance the conventional peroxides. With the aid of a cross-linking agent, particularly hard foams are obtained which in addition have a high temperature resistance.

The foamable plastic mass of the invention may contain further components such as nucleating agents, that is, agents to support the formation of nuclei for the foam bubbles, stabilizers, fillers, flame-retarding compounds, antistatics, pigments, etc. Particularly the addition of an antioxidant is advisable since polypropylene and polymerizates containing polypropylene are more responsive to autoxidation than for instance polyethylene.

The following examples illustrate the invention. In these examples, various samples of a pulverulent propylene polymerizate with an average high molecular weight formed by gas phase polymerization and still containing residual catalyst were blended in different runs with low boiling point hydrocarbons having 5 to 10 carbon atoms. The hydrocarbons were used as the blowing agents or propellants. In addition, there were employed conventional additives such as bubble-nucleating agents, etc. Foaming was effected by means of an extruder.

EXAMPLE 1

A foamable mass was prepared from 87.7 w/o of a propylene polymerizate powder, 4.0 w/o of a silica gel used as nucleating agent ("MIKROSIL" made by the Guilini Brothers Company of Germany), 0.3 w/o of barium stearate, and 8.0 w/o of gasoline 60/95. The pulverulent components were subjected to thorough mixing in a Lodige mixer and the blowing agent was subsequently applied to the powder mixture by spray dusting. This powder mixture containing the blowing agent was then fed in a continuous process into the extruder.

The powdery propylene polymerizate had a melting index between 157 and 162° C. (penetrometer DIN 53445); its melt index MFJ 190/20 was about 2 g./10 min. or MFJ 190/2 below 0.1 g./10 min (DIN 53735 E), respectively. The density of the material was 0.896 g./cm.³ and the reduced specific viscosity determined in DEKALIN (stabilized with 0.2%N phenyl-beta-napthylamine by means of a capillary tube I, $K=0.00999$) at 135° C. and a concentration of 0.1% was $\eta_{red}=9.8$. The isotactic index was about 90.

The polypropylene powder contained 10 w/o of heptane-soluble low molecular polymerizate with atactic and isotactic fractions of which the average molecular weight was between 10,000 and about 100,000. The powder comprised about 28% of polymers having an average molecular weight below 230,000, about 40% polymers having an average molecular weight between 230,000 and 1,150,000 and about 40 w/o having an average molecular weight above 1,150,000 which latter contained about 5 w/o polymers with an average molecular weight above 3,000,000. Its distribution ($\overline{M}_w/\overline{M}_n-1$) was about 8.2.

The propylene polymerizate had the following structure parameters:
a. Numerical means of the molecular weight:
   $\overline{M}_n$ calculated as 125,000
b. Weight mean of the molecular weight:
   $\overline{M}_w$ calculated as 1,151,000.

The diameter of the extruder screw was D=60 mm., its length was 25 D. The screw was a KK screw with a compression ratio of 1:3, the metering zone was 12 D. The cylinder comprises five heating or cooling zones in addition to the water-cooled inlet zone. The temperature of the zones was as follows: inlet zone water cooled; Zone I=160° C.; Zone II=180° C.; Zone III=205° C.; Zone IV=225° C.; Zone V=200° C. The temperature of the nozzle was 190° C. The nozzle in the axial embodiment had a diameter of 120 mm., the nozzle slot had an opening of 0.6 mm. The blowing ratio was about 1:3.3. The production was about 20 kg./h.

There was thus obtained a highly supple foil of a fine structure having a dry and not-paraffinlike feel. The foil had a certain number of shrinkage marks caused by the method of manufacture. The weight per liter was about 300 g., the thickness 0.5 mm. The average molecular weight of the foamed foil at 890,000 was far above the molecular weight of conventional polypropylene foams.

The foil was suitable as a textile or leather substitute. Its chemical resistance was very good; its water vapor diffusion resistance factor was $\mu=54,000$. The foil was therefore particularly suitable for packaging purposes. It could easily be printed and could be provided with facings from various types of materials such as paper, textiles, etc. The foil could be welded by conventional processes. Its printing and adhesion properties could be further improved by treating with a glow discharge. In spite of a low contents of residual catalyst, the foil was highly and surprisingly light resistant. It could therefore well be used for lampshades, etc. Even after exposure to light for more than half a year, it did not show the slightest yellow tinge.

The foil for the same reasons could also be used as bookbinding material. It could be embossed in a conventional process and could also be used as a washable wall paper.

EXAMPLE 2

A mixture of the type identified in example 1 was subjected to extrusion as in example 1. The modifications were that the foamable mass was dyed yellow with 2.0% of a yellow pigment ("Euthylen"). The mixture was further stabilized with 2.0 w/o of N-phenyl-beta-naphthylamine and, instead of 8.0 w/o of gasoline, there was used pentane in an amount of 8.0 w/o and was applied to the mass by spray dusting.

The axial nozzle was replaced by a radial nozzle with a diameter of 134 mm. The slot opening of the nozzle was 0.6 mm. The blowing ratio was 1:4. The inlet zone of the extruder was water-cooled. The temperatures of the heating zones were as follows: Zone I: 100° C.; Zone II: 160° C.; Zone III: 205° C.; Zone IV: 210° C.; Zone V: 200° C. The nozzle temperature was 180° C. The production was 15 kg./h.

There was thus obtained a foil of fine cell structure which was still more supple than the foil obtained in example 1. The weight per liter of foil was 250 g., the thickness was 0.2 mm., the average molecular weight of the foamed foil was 1,100,000.

Conventional foamed foils of polypropylene have a molecular weight between 300,000 and 400,000. The invention surprisingly permits using a high molecular polypropylene of which the melting index, by conventional standards, would make it unfit for processing. This polypropylene by means of the invention, as the examples show, can be extruded without any substantial degradation of the high molecular weight.

EXAMPLE 3

In this example a mixture of the same type as in example 1 was again foamed through an extruder.

The diameter of the extruder screw was D=22 mm., its length was =30 D. It was a pure conveyor screw with a KK stage and a length of the metering zone equal to 10 D. The nozzle was a round nozzle with a nozzle diameter of 2.5 mm. The cylinder in addition to the water-cooled inlet zone had four heating or cooling zones. The temperatures of the zones was as follows: Zone I: water-cooled, ca 20° C.; Zone II: 100° C.; Zone III: 170° C.; Zone IV: 175° C. The nozzle temperature was 170° C. The production was 1 kg./h. In this example there was obtained a round rod of fine cell structure and good suppleness with a 4 mm. diameter and a dull silklike surface of white color. The round rod could be immediately subjected in the same run to stretching without additional heating, that is, without further addition of heat. The stretching was between 1:2 and 1:18. The round rods stretched at a ratio of 1:2 had a weight per liter of 380 g. and a very good tear strength. The average molecular weight was 840,000.

EXAMPLE 4

For comparison purposes, a stereoregular polypropylene such as is available in the open market with an average molecular weight of 400,000 and a reduced specific viscosity of $\eta_{red}=3.7$ (determined in "Dekalin," stabilized with 0.2 w/o N-phenyl-beta-naphthylamine as 0.1% solution at 135° C.) was extruded as in example 3 adding "MIKROSIL," barium stearate and gasoline 60/95.

There was thus obtained a round rod of compact shape which exhibited only a few rather large bubbles. Its weight per liter was 811 g., the average molecular weight was 350,000.

This commercial-grade polypropylene cannot be compared with the foamable mass of the invention. It can be caused to foam only by means of azodicarboneamide in conventional manner. Even so, products are obtained only of a substantially lower quality than obtained with the foamable mass of the invention. The products particularly have the shortcomings of large pores and stiffness of the foils, rods, etc.

EXAMPLE 5

A mixture of the same type as used in example 1 was employed in this example. There was, however, added an amount of 10 w/o of polyethylene in powdery form ("Lupolen," a product of BASF Germany) 1800 S which had a density of 0.916 to 0.918 and a melt index of $(MI_2)$=17–22 g./10 min.

This mixture was extruded as in example 3. There was thus obtained a profiled rod with a fine cell structure which was highly supple. The polyethylene addition improved the flow properties of the foamable mixture. The weight per liter of the unstretched profile was 290 g.

EXAMPLE 6

The same mixture was used as in example 1. However, there was added 20 w/o of poly-alpha-butylene ("Vestolen," a product of the Huels Corporation of Germany) BT 1711 in the form of a powder (viscosity $\eta_{red.}$, c=0.1% in Dekalin at 135° C.=4.0; melt viscosity at 5.0 kp. charge was 0.5 g./10 min. according to DIN 53735).

This mixture was extruded as in example 4.

There was thus obtained a profiled rod having a fine cell structure and suppleness. However, the material was somewhat more tough than the material of example 3. The weight per liter was 300 g.

We claim:

1. A foam-forming polypropylene composition comprising
  a. a stereoregular propylene polymer having a relatively high molecular weight above 600,000 the said molecular weight being too high to permit foaming of the polymer by means of a low-boiling hydrocarbon blowing agent; and the said high molecular weight propylene polymer containing about 5 to 35% by weight of the total polymers of a relatively low molecular weight heptane-soluble propylene polymer having an average molecular weight between 10,000 and 100,000; and
  b. a blowing agent having sufficient affinity for the low molecular weight polypropylene to be absorbed thereby, the said blowing agent being substantially homogeneously distributed throughout the entire polymer mass due to the solubility of the low molecular weight polyropylene in the high molecular weight polypropylene.

2. The composition of claim 1, which is a homopropylene polymer.

3. The composition of claim 1, wherein the propylene polymer includes a copolymer of graft polymer with another polymerizable olefin.

4. The composition of claim 1, wherein the propylene polymer includes a copolymer or graft polymer with a vinyl derivative polymer.

5. The composition of claim 1, wherein the propylene polymer includes a mixture of polypropylene with another olefin polymer.

6. The composition of claim 1, wherein the propylene polymer includes a mixture of the polypropylene with a vinyl derivative polymer.

7. The composition of claim 1, wherein the polypropylene is a gas phase polymerizate.

8. The composition of claim 1 wherein the polypropylene contains residual polymerization catalyst.

9. The composition of claim 1 wherein the polypropylene polymerizate is a gas phase polymerized copolymer or graft polymer of high molecular weight and low molecular weight polypropylene.

10. The composition of claim 1, wherein the polypropylene contains about 20% of polymer having an average below 230,000.

11. The composition of claim 1, wherein the low molecular weight polymerizate comprises about 10% by weight of the polymer mass.

12. The composition of claim 1, wherein the total polypropylene mass has an average molecular weight between 700,000 and 1,200,000.

13. The composition of claim 1, which comprises between 5 and 35% by weight of polypropylene with a molecular weight below 230,000; between 30 and 50% by weight of polypropylene with a molecular weight between 230,000 and 1,150,000; between 30 and 50% of polypropylene with a molecular weight above 1,150,000, the latter component including up to 5% of the total mass of polypropylene with a molecular weight above 3,000,000.

14. The composition of claim 12, wherein the polypropylene with a molecular weight below 230,000 comprises about 20%, the polypropylene with a molecular weight between 230,000 and 1,150,000 comprises about 40% and the polypropylene with a molecular weight above 1,150,000 comprises about 40% by weight of the total polypropylene mass.

15. The composition of claim 1, wherein the low molecular weight propylene of a molecular weight between 10,000 and 100,000 is constituted by isotactic and atactic polypropylene.

16. The composition of claim 15, wherein the said isotactic and atactic polypropylene comprises about 10% of the total mass.

17. The composition of claim 1, which has the following specifications of the propylene at (a) and (b)
  a. Numerical mean of the molecular weight:
  $\overline{M}_n$ calculated as 125,000
  b. Weight mean of the molecular weight:
  $\overline{M}_w$ calculated as 1,151,000
  c. Molecular weight distribution:
  $(\overline{M}_w/\overline{M}_n - 1) = 8.2$.

18. The composition of claim 1, wherein the propylene polymerizate has an isotactic index of about 65 to 95%.

19. The composition of claim 1, wherein the blowing agent is a low boiling point hydrocarbon having between five and ten carbon atoms in the molecule.

20. The composition of claim 1, wherein the blowing agent essentially consists of a gasoline fraction having a boiling point range between 60 and 95° C.

21. The composition of claim 1, which includes a cross-linking agent for the polypropylene.

22. A process of making a foam material of a fine cell structure comprising applying a hydrocarbon blowing agent in the form of a low boiling hydrocarbon to a powdered mass of a high molecular weight and low molecular weight polypropylene polymer composed as defined in claim 1 at (a) and thereafter blowing the mass into a foam by subjecting it to extrusion or injection at an elevated temperature.

23. The process of claim 22, wherein a nucleating agent for the foam cells and a stabilizer are added to the composition.